United States Patent
Kashiwagi

(10) Patent No.: US 7,820,745 B2
(45) Date of Patent: Oct. 26, 2010

(54) WATER-REPELLENT/OIL-REPELLENT COMPOSITION

(75) Inventor: Masato Kashiwagi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 111 days.

(21) Appl. No.: 11/660,966

(22) PCT Filed: Aug. 2, 2005

(86) PCT No.: PCT/JP2005/014117

§ 371 (c)(1),
(2), (4) Date: Feb. 23, 2007

(87) PCT Pub. No.: WO2006/022122

PCT Pub. Date: Mar. 2, 2006

(65) Prior Publication Data

US 2007/0293654 A1    Dec. 20, 2007

(30) Foreign Application Priority Data

Aug. 25, 2004 (JP) .............................. 2004-245304
Aug. 31, 2004 (JP) .............................. 2004-252267

(51) Int. Cl.
*C08K 5/1535* (2006.01)
*C08G 61/00* (2006.01)

(52) U.S. Cl. ...................................... 524/111; 528/397
(58) Field of Classification Search .................. 524/111
See application file for complete search history.

(56) References Cited

U.S. PATENT DOCUMENTS

| 5,372,731 | A | 12/1994 | Michels et al. |
| 5,466,770 | A | 11/1995 | Audenaert et al. |
| 6,048,941 | A | 4/2000 | Yamana et al. |
| 6,059,868 | A | 5/2000 | Kasperchik |
| 6,274,060 | B1 | 8/2001 | Sakashita et al. |
| 6,355,753 | B1 * | 3/2002 | Yamana et al. ........... 526/292.3 |
| 6,610,775 | B1 | 8/2003 | Oharu et al. |
| 6,750,277 | B1 | 6/2004 | Yamana et al. |
| 6,753,376 | B1 | 6/2004 | Yamana et al. |
| 2003/0130457 | A1 | 7/2003 | Maekawa et al. |
| 2004/0014873 | A1 | 1/2004 | Aga et al. |
| 2004/0075074 | A1 | 4/2004 | Kubota et al. |
| 2004/0147665 | A1 | 7/2004 | Yoshioka et al. |
| 2005/0090600 | A1 | 4/2005 | Aga |
| 2005/0267241 | A1 | 12/2005 | Sugimoto et al. |

FOREIGN PATENT DOCUMENTS

| JP | 55-71779 A | 5/1980 |
| JP | 61-264081 A | 11/1986 |
| JP | 61-276880 A | 12/1986 |
| JP | 6-10271 A | 1/1994 |
| JP | 10-501306 A | 2/1998 |
| JP | 10-273879 A | 10/1998 |
| JP | 10-292265 A | 11/1998 |
| JP | 10-316719 A | 12/1998 |
| JP | 2000-136337 A | 5/2000 |
| JP | 2000-212549 A | 8/2000 |
| JP | 2000-282015 A | 10/2000 |
| JP | 2000-282016 A | 10/2000 |
| JP | 2000-290640 A | 10/2000 |
| JP | 2001-158877 A | 6/2001 |
| WO | WO 95/33093 A1 | 12/1995 |
| WO | WO 00/37583 A1 | 6/2000 |
| WO | WO 02/24828 A1 | 3/2002 |
| WO | WO 02/064696 A1 | 8/2002 |
| WO | WO 02/072727 A1 | 9/2002 |
| WO | WO 02/083809 A1 | 10/2002 |
| WO | WO 03/062347 A1 | 7/2003 |
| WO | WO 03/062521 A1 | 7/2003 |
| WO | WO 2004/035708 A1 | 4/2004 |

OTHER PUBLICATIONS

US. Environmental Protection Agency. Office of Pollution Prevention and Toxics. Risk Assessment Division, Preliminary Risk Assessment of the Developmental Toxicity Associated With Exposure to Perfluorooctanoic Acid and Its Salts, Apr. 10, 2003, pp. 1-61, http://www.epa.gov/opptintr/pfoa/pfoara/pdf.
US. Environmental Protection Agency, EPA OPPT Fact Sheet, Apr. 14, 2003., 3 pages, http://www.epa.gov/opptintr/pfoa/pfoafacts.pdf.
US. Environmental Protection Agency, "Erfluorooctanoic Acid (PFOA), Fluorinated Telomers; Request for Comment, Solicitation of Interested Parties for Enforceable Consent Agreement Development, and Notice of Public Meeting", Federal Register, vol. 68, No. 73, Wednesday, Apr. 16, 2003/Notices, p. 18626-18633, [FRL-7303-8]., http://www.epa.gov/opptintr/pfoa/pfoafr.pdf.
US. Enironmental Protiection Agency, "EPA Intensifies Scientific Investigation of a Chemical Processing Aid", EPA Environmental News, Monday Apr. 14, 2003., p. 1-2, http://www.epa.gov/opptintr/pfoa/ptfoaprs.pdf.

* cited by examiner

*Primary Examiner*—Ling-Siu Choi
*Assistant Examiner*—Hui Chin
(74) *Attorney, Agent, or Firm*—Sughrue Mion, PLLC

(57) ABSTRACT

Disclosed is an aqueous water-repellent/oil-repellent composition containing the following components (A), (B) and (C). Fluorine-containing copolymer (A): a copolymer containing a polymerizable monomer (a1) having a perfluoroalkyl group with 1-6 carbon atoms or a perfluoroalkenyl group wherein the amount of (a1) is not less than 20% by weight relative to the copolymer. Surfactant (B): a surfactant essentially containing a sorbitan ester or an alkylene oxide addition product thereof. Aqueous medium (C): a medium substantially containing water only or water and a water-soluble organic solvent.

14 Claims, No Drawings ated with the water-repellent/oil-repellent composition of the present invention. The present invention does not use a long chain fluoroalkyl group-containing polymerizable monomer, particularly does not use a compound having a "telomer" structure, so that the invention can solve an environmental problem.

WATER-REPELLENT/OIL-REPELLENT COMPOSITION

FIELD OF THE INVENTION

The present invention relates to a water- and oil-repellent composition. Particularly, the present invention relates to a water- and oil-repellent composition which is excellent in water resistance.

BACKGROUND ART

Hitherto, copolymers containing a unit derived from a polyfluoroalkyl group-containing polymerizable monomer are widely used as a water- and oil-repellent agent. In order to obtain the polyfluoroalkyl group-containing copolymer, a polymerization method such as a bulk polymerization, a solution polymerization, a suspension polymerization and an emulsion polymerization can be used. Generally, the solution polymerization and the emulsion polymerization are used. Among them, an aqueous emulsion prepared by the emulsion polymerization is industrially advantageous over a solvent dispersion prepared by the solution polymerization, in view of a work-environmental problem and an effect on environment.

A textile treated with the water- and oil-repellent agent are widely used as, for example, usual clothes, sport clothes, interior goods, out door goods and medical non-woven fabrics. The improvement of properties such as softness, soil resistance and water resistance, and durability of the properties in addition to water- and oil-repellency is increasingly sought according to the spread of use.

Recently, in order to solve these problems, JP-A-2000-212549 and JP-A-2000-282016 disclose, for example, the effectiveness of specified crosslinkable (reactive) monomers. JP-A-06-10271, JP-A-10-501306 and JP-A-2000-136337 disclose the combination with an isocyanate compound or a blocked isocyanate compound.

Some documents such as patents disclose polymers such as fluorine-containing (meth)acrylate/vinyl chloride (VCl) or vinylidene chloride (VdCl) or alkyl acrylate.

An Rf group used in Rf group-containing (meth)acrylate used therein is generally a long chain fluoroalkyl group (containing a $C_8$ fluroalkyl group).

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA. On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoaf-acts.pdf) announced that a long chain fluoroalkyl group (telomer) may possibly metabolize or decompose to PFOA.

Recently, the use of a polymerizable monomer containing a short-chain Rf group has been studied for the purpose of decreasing the load on environment by using an alternate compound having chemical skeleton structure different from that of the telomer.

The prior arts using a polymerizable monomer containing a short chain Rf group include, for example, WO03/062521 which discloses a water- and oil-repellent composition comprising a copolymer of a short-chain Rf group-containing (meth)acrylate and vinyl chloride (VCl) or vinylidene chloride ($VdCl_2$) for the purpose of increasing the water resistance. This composition has insufficient water- and oil-repellency and water resistance, and insufficient stability to long-term storage and contaminant. In addition, WO02/083809 and WO04/035708 describe examples using a short-chain Rf group-containing polymerizable monomer, and agents described in these publications suffer from insufficient water- and oil-repellency and water resistance.

A document discloses that, in a polymer comprising a repeat unit derived from an Rf group-containing acrylate, water- and oil-repellency is deteriorated, if the chain length of the Rf group is decreased. The studies conducted by the present inventor also reveal that, if the chain length of the Rf group is simply decreased, a water leakage in a heavy rain durability test such as a Bundesmann test is remarkably increased (deterioration of water resistance).

That is, the conventional arts do not have an aqueous water- and oil-repellent dispersion which is an alternative compound having chemical skeleton structure different from "telomer" and which have both objects of decreasing environmental load and of high water resistance.

PROBLEMS SOLVED BY THE INVENTION

An object of the present invention is to provide a composition which comprises an alternative compound having a chemical skeleton structure different from "telomer" and a less environmental problem, and which can impart high water resistance to a textile substrate.

MEANS FOR SOLVING THE PROBLEMS

The present invention provides an aqueous water- and oil-repellent composition comprising:
(A) a fluorine-containing copolymer which comprises:
  (a1) a polymerizable monomer which contains a perfluoroalkyl or perfluoroalkenyl group having 1 to 6 carbon atoms,
  (a2) a polymerizable monomer which is copolymerizable with the monomer (a1) wherein a homopolymer of the polymerizable monomer (a2) has a glass transition temperature (Tg) of at least 50° C. and/or a melting point (Tm) of at least 30° C., and if necessary,
  (a3) a polymerizable monomer containing a polar group or a reactive group,
    the amount of the polymerizable monomer (a1) is at least 20% by weight based on the copolymer;
(B) a surfactant which comprises:
  (b1) a nonionic surfactant which is a sorbitan ester and/or an alkylene oxide adduct thereof; and
(C) an aqueous medium which is water alone or a mixture of water and an organic solvent.

The present invention also provides an aqueous water- and oil-repellent blend comprising the above-mentioned aqueous water- and oil-repellent composition and a crosslinking agent.

EFFECT OF THE INVENTION

The present invention can provide excellent water- and oil-repellency, in particular, high water resistance to a textile substrate, and can have good stability (such as mechanical stability, chemical stability and long-term stability).

EMBODIMENTS FOR CARRYING OUT THE INVENTION

The polymerizable monomer (a1) used in the present invention is a compound having a perfluoroalkyl or perfluoroalkenyl group and a polymerizable unsaturated group.

The upper limit of the carbon number of the perfluoroalkyl group or perfluoroalkenyl group is 6, for example, 5, particularly 4. Examples of the perfluoroalkyl group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$ and —$(CF_2)_3CF(CF_3)_2$. Examples of the perfluoroalkenyl group include —CF=$CF(CF_3)$, —CF=$C(CF_3)_2$, —$C(CF_3)$=$CF(CF(CF_3)_2)$ and —$C(CF_2CF_3)$=$C(CF_3)_2$.

The polymerizable unsaturated group includes an acrylate group (—OC(=O)—CH=$CH_2$), methacrylate group (—OC(=O)—C($CH_3$)=$CH_2$), a vinyl group (—CH=$CH_2$), a vinylene group (—CH=CH—), a vinylidene group (=C=$CH_2$) and an α-substituted acrylate group [—OC(=O)—CX=$CH_2$ wherein X is a halogen atom (for example, a fluorine atom, a chlorine atom, a bromine atom and a iodine atom), a CFX$^1$X$^2$ group (wherein X$^1$ and X$^2$ is a hydrogen atom, a fluorine atom, a chlorine atom, a bromine atom or a iodine atom) (for example, $CF_3$), a cyano group, a linear or branched fluoroalkyl group having 1 to 21 carbon atoms, a substituted or unsubstituted benzyl group, or a substituted or unsubstituted phenyl group].

The polymerizable monomer (a1) is, for example, a compound of the following formula (11):

(Rf-A)$_n$-B          Formula (11)

wherein Rf is a $C_1$-$C_6$ perfluoroalkyl group or perfluoroalkenyl group,

A is a divalent organic group or a single bond,

B is a polymerizable unsaturated group, and n is 1 or 2.

In the formula (11), the divalent organic group (the A group) includes an ester group (—C(=O)O—), an amide group, an ether group (—O—), —$CH_2$CH(OX)$CH_2$— (wherein X is hydrogen or an acyl group having 1 to 5 carbon atoms) and a combination thereof.

The polymerizable monomer (a1) may be anyone of compounds of the following formulas (11-1) to (11-7):

Rf—$SO_2$—N(R$^1$)—R$^2$—OCOCR$^3$=$CH_2$     Formula (11-1)

Rf—R$^2$—OCOCR$^3$=$CH_2$     Formula (11-2)

Rf—CO—N(R$^1$)—R$^2$—OCOCR$^3$=$CH_2$     Formula (11-3)

RfCH$_2$CH(OR$^4$)CH$_2$—OCOCR$^3$=$CH_2$     Formula (11-4)

Rf—O—Ar—CH$_2$—OCOCR$^3$=$CH_2$     Formula (11-5)

Rf—R—$SO_2$—R$^2$—OCOCR$^3$=$CH_2$     Formula (11-6)

Rf—R$^2$—O—CON(R$^1$)—R$^6$—OCOCR$^3$=$CH_2$     Formula (11-7)

wherein

Rf: $C_1$ to $C_6$ perfluoroalkyl group or perfluoroalkenyl group

R$^1$: H or a $C_1$ to $C_4$ alkyl group

R$^2$: a $C_1$ to $C_{10}$ alkylene group

R$^3$: H, a $C_1$ to $C_4$ alkyl group or halogen

R$^4$: H or a $C_1$ to $C_4$ acyl group

Ar: an aromatic group, particularly a phenylene group

R$^5$: a $C_1$ to $C_{10}$ alkylene group or a single bond

R$^6$: a $C_1$ to $C_{10}$ alkylene group or —R$^7$—N(R$^1$)CO—O—R$^2$—

R$^7$: a $C_1$ to $C_{10}$ alkylene group, a cycloalkylene group, a phenylene group, a tolylene group or

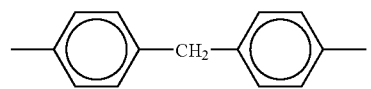

The polymerizable monomer (a1) is preferably a (meth) acrylate which may be substituted at alpha-position.

Specific examples of the polymerizable monomer (a1) are as follows:

$C_2F_5CH_2OCOCH$=$CH_2$, $C_2F_5CH_2OCOC(CH_3)$=$CH_2$,
$C_2F_5CH_2OCOCF$=$CH_2$, $C_2F_5CH_2OCOCCl$=$CH_2$,
$C_2F_5CH_2CH_2OCOCH$=$CH_2$, $C_2F_5CH_2CH_2OCOC(CH_3)$=$CH_2$,
$C_2F_5CH_2CH_2OCOCF$=$CH_2$,
$C_2F_5CH_2CH_2OCOCCl$=$CH_2$,
$C_4F_9CH_2CH_2OCOCH$=$CH_2$, $C_4F_9CH_2CH_2OCOC(CH_3)$=$CH_2$,
$C_4F_9CH_2CH_2OCOCF$=$CH_2$,
$C_4F_9CH_2CH_2OCOCCl$=$CH_2$,
$C_6F_{13}CH_2CH_2OCOCH$=$CH_2$, $C_6F_{13}CH_2CH_2OCOC(CH_3)$=$CH_2$,
$C_6F_{13}CH_2CH_2OCOCF$=$CH_2$,
$C_6F_{13}CH_2CH_2OCOCCl$=$CH_2$,
$(CF_3)_2CFCF_2CF_2CH_2CH_2OCOCH$=$CH_2$,
$(CF_3)_2CFCF_2CF_2CH_2CH_2OCOC(CH_3)$=$CH_2$,
$(CF_3)_2CFCF_2CF_2CH_2CH_2OCOCF$=$CH_2$,
$(CF_3)_2CFCF_2CF_2CH_2CH_2OCOCCl$=$CH_2$,
$(CF_3)_2CFCH_2CH_2OCOCH$=$CH_2$, $(CF_3)_2CFCH_2CH_2OCOC(CH_3)$=$CH_2$,
$(CF_3)_2CFCH_2CH_2OCOCF$=$CH_2$, $(CF_3)_2CFCH_2CH_2OCOCCl$=$CH_2$,
$C_4F_9SO_2N(CH_3)CH_2CH_2OCOCH$=$CH_2$,
$(CF_3)_2CFCF_2CF_2CH_2CH(OCOCH_3)CH_2OCOCH$=$CH_2$,
$C_6F_{11}O$—$C_6H_4$—$CH_2OCOCH$=$CH_2$
$C_2F_5$—$SO_2$—$CH_2CH_2OCOCH$=$CH_2$, $C_2F_5$—$SO_2$—$CH_2CH_2OCOC(CH_3)$=$CH_2$
$C_2F_5CH_2CH_2$—$SO_2$—$CH_2CH_2OCOCH$=$CH_2$,
$C_2F_5CH_2CH_2$—$SO_2$—$CH_2CH_2OCOC(CH_3)$=$CH_2$
$C_4F_9$—$SO_2$—$CH_2CH_2OCOCH$=$CH_2$, $C_4F_9$—$SO_2$—$CH_2CH_2OCOC(CH_3)$=$CH_2$
$C_4F_9CH_2CH_2$—$SO_2$—$CH_2CH_2OCOCH$=$CH_2$,
$C_4F_9CH_2CH_2$—$SO_2$—$CH_2CH_2OCOC(CH_3)$=$CH_2$
$C_4F_9CH_2CH_2$—O—CONH—$CH_2CH_2OCOCH$=$CH_2$,
$C_4F_9CH_2CH_2$—O—CONH—$CH_2CH_2OCOC(CH_3)$=$CH_2$
$C_4F_9CH_2CH_2$—O—CONH—R$^7$—NHCO—O—$CH_2CH_2OCOCH$=$CH_2$
(R$^7$: a tolylene group),
$C_4F_9CH_2CH_2$—O—OONH—R$^7$—NHCOO—O—$CH_2CH_2OCOC(CH_3)$=$CH_2$
(R$^7$: a tolylene group)

The polymerizable monomer (a2) used in the present invention is not limited and may be a compound of the following formula (12):

(R-A)$_n$-B          Formula (12)

wherein R is $C_1$-$C_{30}$ alkyl group, cycloalkyl group, alkenyl group or cycloalkenyl group, A is a divalent organic group or a single bond, B is a polymerizable unsaturated group, and n is 1 or 2.

In the formula (12), the divalent organic group (the A group) includes an ester group (—C(=O)O— or —OC(=O)—), an amide group and an ether group (—O—). The polymerizable unsaturated group (the B group) includes an acrylate group (—OC(=O)—CH=$CH_2$), a methacrylate group (—OC(=O)—C($CH_3$)=$CH_2$), a vinyl group (—CH=$CH_2$), a vinylene group (—CH=CH—), a vinylidene group (=C=$CH_2$), an alpha-substituted acrylate group [—OC(=O)—CX=$CH_2$ wherein X is halogen (such as fluorine, chlorine or bromine), $CF_3$ or CN]

The polymerizable monomer (a2) may be a compound of any of the following formula (12-1) to (12-5).

$$R\text{—OCOC}R^3=CH_2 \qquad \text{Formula (12-1)}$$

$$R\text{—OCOCH}=CHCOO\text{—}R \qquad \text{Formula (12-2)}$$

$$R^1\text{—COOCH}=CH_2 \qquad \text{Formula (12-3)}$$

$$R^2\text{—C}R^3=CH_2 \qquad \text{Formula (12-4)}$$

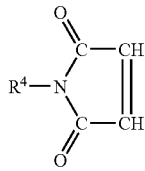

Formula (12-5)

wherein R is $C_1$-$C_{30}$ alkyl group, cycloalkyl group, alkenyl group or cycloalkenyl group, $R^1$ is $C_1$-$C_{20}$ alkyl group, $R^2$ is $C_1$-$C_{30}$ alkyl group, cycloalkyl group or aromatic group, or halogen, $R^3$ is H, $C_1$-$C_4$ alkyl group, or halogen, and $R^4$ is H, $C_1$-$C_{10}$ alkyl group or cycloalkyl group.

Specific examples of the polymerizable monomer (a2) include:

alkyl ($\geq C_{15}$) (meth)acrylates such as cetyl (meth)acrylate, stearyl (meth)acrylate and behenyl (meth)acrylate;

alicyclic alkyl or alicyclic alkenyl ($\geq C_6$) (meth)acrylates such as cyclohexyl (meth)acrylate, isobornyl (meth)acrylate and tricyclodecyl (meth)acrylate;

vinyl chloride;

fatty acid vinyl esters having at least 15 carbon atoms, such as vinyl stearate; and N-alkyl maleimide, such as N-methyl maleimide and N-cyclohexyl maleimide.

Other examples of the polymerizable monomer (a2) include methyl (meth)acrylate, acrylonitrile, styrene, alkyl vinyl ether, and alpha-olefin.

The polymerizable monomer (a2) is such that a homopolymer of the polymerizable monomer (a2) has a glass transition temperature (Tg) of at least 50° C., for example, at least 60° C., particularly at least 70° C., and/or a melting point (Tm) of at least 30° C., for example, at least 40° C., particularly at least 50° C. When Tg and/or Tm are in these ranges, high water- and oil-repellency is obtained. Preferably, the upper limit of Tg is 200° C. and the upper limit of Tm is 200° C.

The polymerizable monomer (a3) optionally used in the present invention contains a polar group and/or a reactive group.

Examples of the polar group include a hydroxyl group (—OH), a polyoxyalkylene group, an amino group (—$NR_2$ wherein R is hydrogen or a $C_1$-$C_4$ alkyl group), an N-methylol group (—$NHCH_2OH$), an amide group, a carboxyl group (—COOH), and a halogen group.

Examples of the reactive group include an epoxy group and a blocked isocyanate group.

Specific example of the polymerizable monomer (a3) include 3-chloro-2-hydroxypropyl (meth)acrylate, N-methylol (meth) acrylamide, 2-hydroxyethyl (meth)acrylate, 2-hydroxypropyl (meth)acrylate, chloromethyl styrene, glycidyl (meth)acrylate, diacetone acrylamide, glycerin mono(meth)acrylate, polyoxyalkylene glycol mono(meth)acrylate, and blocked isocyanate group-containing (meth)acrylate.

The copolymer (A) may contain a polymerizable monomer copolymerizable with the component (a1), for example, alkyl ($\leq C_{14}$) (meth)acrylates such as butyl (meth)acrylate, 2-ethylhexyl (meth)acrylate, lauryl (meth)acrylate; vinylidene chloride, butadiene, chloroprene, isoprene, vinyl acetate and alkyl vinyl ether, in addition to the components (a1), (a2) and (a3).

The copolymer (A) may be a homopolymer or a binary copolymer, but is preferably a copolymer having at least three monomers.

The amount of the components (a1), (a2) and (a3) in the copolymer (A) may be as follows:

the component (a1) may be 20 to 100% by weight, the component (a2) may be 0 to 80% by weight, and the component (a3) may be 0 to 20% by weight;

the component (a1) is preferably 30 to 95% by weight, the component (a2) is preferably 5 to 70% by weight, and the component (a3) is preferably 0 to 15% by weight; and the component (a1) is more preferably 35 to 90% by weight, the component (a2) is more preferably 9 to 60% by weight, and the component (a3) is more preferably 1 to 10% by weight, based on the copolymer (A).

The surfactant (B) used in the present invention essentially contains (b1) the nonionic surfactant which is a sorbitan ester or an alkylene oxide adduct thereof.

The surfactant (B) may contain (b2) another nonionic surfactant and/or (b3) a cationic surfactant.

The sorbitan ester is an ester between a carboxylic acid (carbon number: 1 to 30) and sorbitan. The mole number of carboxylic acid in the sorbitan ester is 1, 2 or 3. A monocarboxylic acid ester is preferable.

In the alkylene oxide adduct of sorbitan ester, the alkylene oxide is preferably ethylene oxide or propylene oxide. In the alkylene oxide adduct, the addition mole number of the alkylene oxide may be from 1 to 50, particularly from 1 to 30.

The sorbitan ester or alkylene oxide adduct thereof (b1) may be a surfactant of the formula:

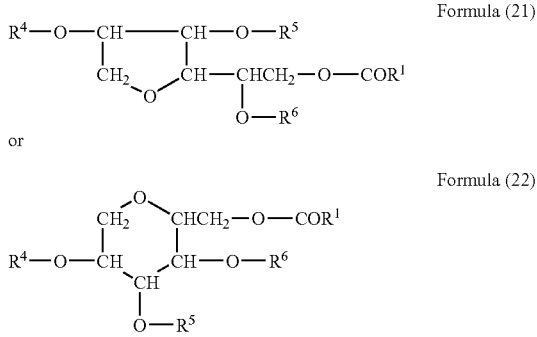

Formula (21)

Formula (22)

wherein $R^1$ is an alkyl group having 1 to 22 carbon atoms or an alkenyl group having 2 to 22 carbon atoms, $R^4$, $R^5$ and $R^6$ each is H, $R^1CO-$, $-(CH_2CH_2O)_p-(R^2O)_q-R^3$ ($R^2$ is an alkylene group having at least 3 carbon atoms, $R^3$ is a hydrogen atom, an alkyl group having 1 to 22 carbon atoms or an alkenyl group having 2 to 22 carbon atoms, p is the number of at least 2, and q is the number of 0 or at least 1).

Specific examples of the nonionic surfactants (b1) represented by the formula (21) or (22) include sorbitan monolaurate, sorbitan monostearate, sorbitan monopalmitate, sorbitan monooleate, sorbitan sesquistearate, sorbitan tristearate, polyoxyethylene sorbitan monolaurate, polyoxyethylene sorbitan monopalmitate, polyoxyethylene sorbitan monostearate, polyoxyethylene sorbitan monooleate, and polyoxyethylene sorbitan tristearate.

The other nonionic surfactant (b2) includes an alkylene oxide adduct of linear and/or branched aliphatic (saturated and/or unsaturated) group, a polyalkylene glycol ester of linear and/or branched fatty acid (saturated and/or unsaturated), a polyoxyethylene (POE)/polyoxypropylene (POP) copolymer (a random copolymer or block copolymer), and an alkylene oxide adduct of acetylene glycol. Among them, the structure of the alkylene oxide addition portion and polyalkylene glycol portion is preferably polyoxyethylene (POE) or polyoxypropylene (POP) or a POE/POP copolymer (which may be a random copolymer or a block copolymer).

Preferably, the other nonionic surfactant (b2) has a structure free of an aromatic group in view of environmental problem (such as biodegradability and environmental hormone).

The other nonionic surfactant (b2) may be a surfactant of the formula:

$$R^1O-(CH_2CH_2O)_p-(R^2O)_q-R^3 \quad \text{Formula (23)}$$

wherein $R^1$ is an alkyl group having 1 to 22 carbon atoms or an alkenyl group having 2 to 22 carbon atoms, $R^2$ is an alkylene group having at least 3 (for example, 3 to 10) carbon atoms, $R^3$ is a hydrogen atom, an alkyl group having 1 to 22 carbon atoms or an alkenyl group having 2 to 22 carbon atoms, p is the number of at least 2, and q is the number of 0 or at least 1.

Examples of $R^2$ are a propylene group and a butylene group.

Specific examples of the nonionic surfactant (b2) represented by the formula (23) include:

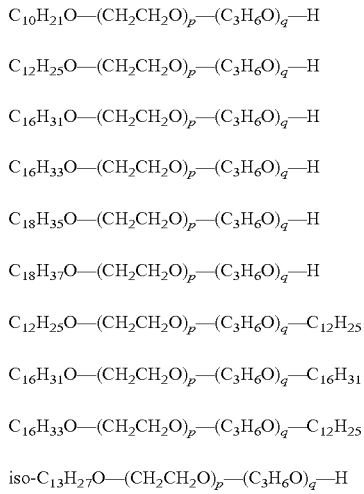

$C_{10}H_{21}O-(CH_2CH_2O)_p-(C_3H_6O)_q-H$ $C_{12}H_{25}O-(CH_2CH_2O)_p-(C_3H_6O)_q-H$ $C_{16}H_{31}O-(CH_2CH_2O)_p-(C_3H_6O)_q-H$ $C_{16}H_{33}O-(CH_2CH_2O)_p-(C_3H_6O)_q-H$ $C_{18}H_{35}O-(CH_2CH_2O)_p-(C_3H_6O)_q-H$ $C_{18}H_{37}O-(CH_2CH_2O)_p-(C_3H_6O)_q-H$ $C_{12}H_{25}O-(CH_2CH_2O)_p-(C_3H_6O)_q-C_{12}H_{25}$ $C_{16}H_{31}O-(CH_2CH_2O)_p-(C_3H_6O)_q-C_{16}H_{31}$ $C_{16}H_{33}O-(CH_2CH_2O)_p-(C_3H_6O)_q-C_{12}H_{25}$ iso-$C_{13}H_{27}O-(CH_2CH_2O)_p-(C_3H_6O)_q-H$ wherein p and q are the same as defined above.

The nonionic surfactant (b2) may be a surfactant of the formula:

$$R^1COO-(CH_2CH_2O)_p-(R^2O)_q-R^7 \quad \text{Formula (24)}$$

wherein $R^1$ is an alkyl group having 1 to 22 carbon atoms or an alkenyl group having 2 to 22 carbon atoms, $R^2$ is an alkylene group having at least 3 (for example, 3 to 10) carbon atoms, $R^7$ is H, $R^1CO-$, or $R^3$ (in which $R^3$ is an alkyl group having 1 to 22 carbon atoms or an alkenyl group having 2 to 22 carbon atoms), p is the number of at least 2, and q is the number of 0 or at least 1.

Specific examples of the nonionic surfactant (b2) represented by the formula (24) include:

$C_{17}H_{35}COO-(CH_2CH_2O)_p-H$ $C_{17}H_{33}COO-(CH_2CH_2O)_p-H$ $C_{17}H_{35}COO-(CH_2CH_2O)_p-(C_3H_6O)_q-H$ $C_{17}H_{35}COO-(CH_2CH_2O)_p-OCC_{17}H_{35}$ $C_{15}H_{31}COO-(CH_2CH_2O)_p-H$ $C_{11}H_{23}COO-(CH_2CH_2O)_p-H$ wherein p and q are the same as defined above.

The other nonionic surfactant other than described above may be used together.

The cationic surfactant (b3) is preferably an ammonium salt. The cationic surfactant (b3) may be an ammonium salt having the structure of the following formula:

$$R^1_p-N^+R^2_qX^-$$

wherein $R^1$ is a linear and/or branched aliphatic (saturated and/or unsaturated) group having at least 12 carbon atoms (for example $C_{12-50}$), $R^2$ is H, a $C_{1-4}$ alkyl group, a benzyl group, or a polyoxyethylene group (the number of the oxyethylene group is from, for example, 1 (particularly 2, especially 3) to 50) ($CH_3$ and $C_2H_5$ are particularly preferable), X is halogen, or a $C_{1-4}$ fatty acid anion group, p is 1 or 2, and q is 2 or 3, provided that p+q=4. $R^1$ may be from $C_{12}$ to $C_{50}$, for example from $C_{12}$ to $C_{30}$.

The amount of the nonionic surfactant (b1) in the surfactant (B) may be from 1 to 100% by weight, for example, from 5 to 100% by weight, based on the surfactant (B). The amount of the other nonionic surfactant (b2) may be from 0 to 1000 parts by weight, for example, from 5 to 500 parts by weight, based on 100 parts by weights of the nonionic surfactant (b1). The amount of the cationic surfactant (b3) may be from 0 to 500 parts by weight, for example, from 1 to 300 parts by weight, based on totally 100 parts by weights of the nonionic surfactants (b1) and (b2).

The amount of the surfactant (B) may be from 0.1 to 20 parts by weight, preferably from 1 to 15 parts by weight, based on 100 parts by weight of the fluorine-containing polymer (A).

The total aqueous medium (C) used in the present invention may be substantially water alone, or may be a mixture of water and an organic solvent. The aqueous medium (C) may be substantially water alone (the content of water is at least 98% by weight, particularly at least 99% by weight).

The organic solvent is preferably miscible with water. Examples of the organic solvent include ethylene glycol, propylene glycol, dipropylene glycol, tripropylene glycol, dipropylene glycol monomethyl ether, acetone, methyl ethyl ketone, ethanol and isopropanol.

When the organic solvent is used, it is preferable to use a solvent having a high flash point (for example, at least 20° C., preferably at least 50° C.) in an amount as small as possible (for example, at most 40% by weight, preferably at most 30% by weight) with considering problems such as flammability, odor and environmental load The amount of the aqueous medium (C) may be in such amount that the content of the fluorine-containing copolymer (A) is from 0.01 to 80% by weight, for example, from 0.02 to 50% by weight, based on the aqueous composition.

The aqueous water- and oil-repellent composition of the present invention can be prepared by a method which comprises charging the polymerizable monomers (a1), (a2) and (a3), the surfactant (B), and the aqueous medium (C), performing the emulsification and then performing the polymerization. If necessary, a polymerization method such as a dropwise polymerization and a seed polymerization can be used. The composition can be prepared by performing the emulsion polymerization in the presence of a surfactant other than the surfactant (b1) and then adding the surfactant (b1).

When a part of the polymerizable monomers is gaseous, the raw materials except the gaseous monomer are charged and then emulsified, and the gaseous monomer is charged before the polymerization so that the polymer can be prepared.

Preferably, in the case of the conduction of emulsification, after preliminary dispersion using, for example, a homomixer if necessary, an ultrasonic emulsifier or a high pressure homogenizer is used to emulsify the polymerizable monomer so that the emulsified polymerizable monomer has a particle size of at most 0.3 micrometers.

For the polymerization, a chain transfer agent for adjusting the molecular weight of the copolymer and a polymerization initiator can be used.

Examples of the chain transfer agent include octyl mercaptan, lauryl mercaptan, stearyl mercaptan, and 2-hydroxyethyl mercaptan.

Examples of the polymerization initiator include azo initiators such as 2,2'-azobisisobutyronitrile, 2,2'-azobis(2-amidinopropane) dihydrochloride and 2,2'-azobis[2-(2-imidazolin-2-yl)propane]dihydrochloride; peroxide initiators such as t-butyl peroxypivalate and t-butyl peroxyneodecanoate; and redox initiators.

In the obtained aqueous water- and oil-repellent composition, the dispersed resin preferably has at most 0.25 micrometer, for example, at most 0.15 micrometer from the viewpoint of sedimentation stability.

If necessary, the water- and oil-repellent composition of the present invention may contain additives such as a crosslinking agent, another polymer, another water-repellent agent and/or oil-repellent agent, an anti-soiling agent, a mothproofing agent, a flame retardant, an antistatic agent, a dye stabilizing agent, an anti-crease agent, an anti-shrinkage agent, a feeling processing agent, a soft-finishing agent and a antifoaming agent, according to a purpose.

It is preferable to use a crosslinking agent for the purpose of improving water resistance.

The crosslinking agent includes a blocked isocyanate compound, a melamine resin compound, a glyoxal resin compound, a urea resin compound, a polymer comprising a crosslinkable monomer (for example, a blocked material of 2-isocyanatoethyl methacrylate, and N-methylol acrylamide) as an essential polymerization unit. The blocked isocyanate compound and the melamine resin compound are preferable. The blocked isocyanate compound is preferably a compound which is free of a polymerizable unsaturated group, and which has the structure wherein an isocyanate group of the polyisocyanate is blocked with a blocking agent. The melamine resin compound includes trimethylol melamine and hexamethylol melamine.

A substrate to be treated with the water- and oil-repellent composition obtained in the present invention includes textiles, paper, wood, leather, plastics, glass, brick, cement, and masonry. The textiles in the form of a fiber, a yarn or a fabric are preferable.

The substrate is treated by adhering the composition of the present invention (especially the fluorine-containing copolymer) to the substrate.

The composition according to the present invention can be applied to the substrate preferably by coating, dipping, spraying, padding, roll coating, or combination of these procedures. Generally, the substrate is immersed in the aqueous water- and oil-repellent composition, excess liquid is removed with squeeze rollers and then drying and if necessary thermal curing are conducted. The treatment amount of applying the composition of the present invention to the substrate is preferably such that the amount of the copolymer (A) is from about 0.01 to 1% by weight based on the substrate.

EXAMPLES

Examples are shown hereinafter to illustrate the present invention in detail. In Examples, "%" and "parts" means "% by weight" and "parts by weight", respectively, unless otherwise specified.

Properties evaluated in Examples are measured as follows:

Water- and Oil-Repellency

The polymer dispersion liquid is diluted with water to give a treatment liquid having a solid content of 0.6% by weight. A nylon taffeta cloth (NATURAINE manufactured by Kanebo, nylon-6, a dyed dark blue cloth) (Ny) and a polyester/cotton mixture cloth (twill, undyed, mercerized) (PET/C) are immersed in the treatment liquid, squeezed with a mangle to give a wet pickup of 40% (nylon) and 60% (polyester/cotton mixture), dried at 100° C. for two minutes, heated at 160° C. for one minute, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in the following Table 2 according to AATCC-TM118 on two positions of a surface of a test cloth and observing the penetration state of the drops after 30 seconds. The maximum point at which the test solution exhibits no penetration is expressed by the oil-repellency.

TABLE 1

| Water repellency No. | State |
| --- | --- |
| 5 | No wet on the surface |
| 4 | Slight wet on the surface |
| 3 | Partial wet on the surface |
| 2 | Wet on the surface |
| 1 | Wet over the whole surface |

TABLE 2

| Oil-repellency | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Bundesmann Test

The polymer dispersion liquid is diluted with water to give a treatment liquid having a solid content of 0.6% by weight. A polyester/cotton mixture cloth (twill, undyed, mercerized) (PET/C) is immersed in the treatment liquid, squeezed with a mangle to give a wet pickup of 60% (polyester/cotton mixture), dried at 100° C. for two minutes, and heated at 160° C. for one minute, and then the treated fabric was subjected to the evaluation of an water leakage amount.

The water leakage amount was determined by measuring a water leakage amount after 10 minutes (the amount of water which has penetrated the treated cloth) according to a Bundesmann test method of DIN53888. Less water leakage amount is preferable.

Sedimentation Stability

After the water- and oil-repellent composition having the solid content of 30 mass % is stored at 40° C. for one month, the generation of sediment is observed. The absence of sediment is preferable.

Good: No sediment
 Fair: Slight sediment
 Poor: Much sediment

Mechanical Stability

The water- and oil-repellent composition is diluted with tap water to a solid concentration of 0.2 mass % and stirred with a homomixer at 3,000 rpm for 10 minutes. The generated scum is filtered off with a black cotton cloth. The absence of scum is preferable.

Good: No scum generated
 Fair: Slight scum generated
 Poor: Much scum generated

Chemical Stability

The water- and oil-repellent composition is diluted with tap water to a solid concentration of 0.6 mass %. 0.006 mass % of a dispersion dye is added and the mixture is intimately mixed. The generation of agglomerated material is observed. The absence of agglomerated material is preferable.

Good: No agglomerated material generated
 Fair: Slight agglomerated material generated
 Poor: Much agglomerated material generated Example 1

$C_4F_9CH_2CH_2OCOC(CH_3)=CH_2$ (hereinafter referred to as "9FMA") (38.1 g), stearyl acrylate (hereinafter referred to as "StA") (14.6 g), N-methylolacrylamide (hereinafter referred to as "N-MAM") (1.2 g), 3-chloro-2-hydroxypropyl methacrylate (hereinafter referred to as "CHPMA") (0.6 g), polyoxyethylene polyoxypropylene alkyl ether (nonionic surfactant, HLB value: 12) (EBD-12 manufactured by NOF Corp.) (0.8 g), polyoxyethylene sorbitan monolaurate (HLB value: 17) (LT-221 manufactured by NOF Corp.) (3.0 g), stearyl trimethyl ammonium chloride (STMAC) (1.4 g), tripropylene glycol (16 g), ion-exchanged water (70 g), lauryl mercaptan (0.03 g), and acetic acid (0.12 g) were charged. The mixture was warmed at 60° C., preliminarily dispersed by a homomixer, and emulsified for 15 minutes by an ultrasonic emulsifier.

The emulsified liquid was transferred into a 300 mL four-necked flask (equipped with a stirrer, a condenser, a thermometer, and a nitrogen-introducing pipe), which was replaced with nitrogen. At 60° C., a polymerization initiator, that is, azobisamidinopropane dihydrochloride (0.3 g) was added to initiate the polymerization. After stirring at 60° C. for 4 hours, the disappearance of the monomer was confirmed by GC, and an aqueous dispersion of polymer having a solid content of 40% was obtained. The dispersion was diluted with ion-exchanged water to give a water- and oil-repellent composition having a solid content of 30%. The composition of the polymer was almost the same as the composition of the added monomers.

The characteristics of the water- and oil-repellent composition were evaluated. The results are shown in Table 3.

Examples 2 to 5, and Comparative Examples 1 to 6

A water- and oil-repellent composition having a solid content of 30% was obtained in the same manner as in Example 1 except that only the types and amounts of the emulsifiers were changed as in Table 3. The characteristics of the obtained composition were evaluated. The results are shown in Table 3.

TABLE 3

| | Emulsifier | HLB value | Example 1 | 2 | 3 | 4 | 5 | Com. Ex. 1 | 2 | 3 | 4 | 5 | 6 |
|---|---|---|---|---|---|---|---|---|---|---|---|---|---|
| Nonionic surfactant | PP-40R (b1) | 7 | | | | | 0.8 | | | | | | |
| | LP-20R (b1) | 9 | | | | 0.8 | | | | | | | |
| | LT-221 (b1) | 17 | 3.0 | 3.0 | 3.0 | 3.0 | | | | | | | |
| | EBD-12 (b2) | 12 | 0.8 | | | | | | | | | | |
| | EBD-9 (b2) | 9 | | 0.8 | | | | | | | | 1.4 | |
| | EBD-4 (b2) | 4 | | | 0.8 | | | 3.8 | | | | | |
| | BT-20 (b2) | 16 | | | | | 3.0 | | | | | | |
| | Pronon 204 (b2) | 5 | | | | | | | 0.8 | | | | |
| | BO-20 (b2) | 17 | | | | | | | 3.0 | | | | |
| | BO-50 (b2) | 18 | | | | | | | | | | 3.8 | |
| | BS-20 (b2) | 18 | | | | | | | | | 3.8 | | 1.4 |
| Ionic surfactant | STMAC (b3) | | 1.4 | 1.4 | 1.4 | 1.4 | 1.4 | 1.4 | 1.4 | | | | |
| | CPOEAC (b3) | | | | | | | | | 5.2 | 1.4 | | |
| | SPOEAS | | | | | | | | | | | | 0.8 |
| | STDS | | | | | | | | | | | | 3.0 |
| Water repellency | Ny | | 5 | 5 | 5 | 5 | 5 | 5 | 5 | 5 | 5 | 1 | 1 |
| | PET/C | | 4 | 4 | 4 | 4 | 4 | 3 | 3 | 2 | 2 | 2 | 2 |
| Oli repellency | Ny | | 2 | 2 | 2 | 2 | 2 | 2 | 2 | 1 | 1 | 0 | 0 |
| | PET/C | | 4 | 4 | 4 | 4 | 4 | 2 | 1 | 2 | 2 | 0 | 0 |
| Bundesmann Water leakage amount (ml) after 10 minutes | | | 9 | 8 | 5 | 7 | 8 | 52 | 36 | 37 | 48 | 343 | 288 |
| Sedimentation stability | | | Good | Good | Good | Good | Good | Good | Fair | Bad | Fair | Fair | Good |
| Mechanical stability | | | Good | Good | Good | Good | Good | Good | Bad | Bad | Bad | Bad | Good |
| Chemical stability | | | Good | Good | Good | Good | Good | Fair | Fair | Bad | Good | Good | Good |

PP-40R: Sorbitan monopalmitate (manufactured by NOF Corp.)
LP-20R: Sorbitan monolaurate (manufactured by NOF Corp.)
LT-221: Polyoxyethylene sorbitan monolaurate (manufactured by NOF Corp.)
EBD-12, EBD-9 and EBD-4: Polyoxyethylene polyoxypropylene alkyl ether (manufactured by NOF Corp.)
BT-20: polyoxyethylene secondary alkyl ether (manufactured by Nikko Chemicals Co., Ltd.)
BS-20: Polyoxyethylene stearyl ether (manufactured by Nikko Chemicals Co., Ltd.)
BO-20 and BO-50: Polyoxyethylene oleyl ether (manufactured by Nikko Chemicals Co., Ltd.)
Pronon 204: Polyoxyethylene polyoxypropylene block copolymer (manufactured by NOF Corp.)
STMAC: Stearyl trimethyl ammonium chloride
CPOEAC: Coconut oil alkyl bis(polyoxyethylene) methyl ammonium chloride
SPOEAS: Sodium polyoxyethylene alkyl ether sulfate
STDS: Sodium tetradecene sulfonate

Example 6

$C_4F_9CH_2CH_2OCOC(CH_3)=CH_2$ (hereinafter referred to as "9FMA") (32.7 g), stearyl acrylate (hereinafter referred to as "StA") (20.0 g), N-methylolacrylamide (hereinafter referred to as "N-MAM") (1.2 g), 3-chloro-2-hydroxypropyl methacrylate (hereinafter referred to as "CHPMA") (0.6 g), polyoxyethylene polyoxypropylene alkyl ether (nonionic surfactant, HLB value: 9) (EBD-9 manufactured by NOF Corp.) (0.8 g), polyoxyethylene sorbitan monolaurate (HLB value: 17) (LT-221 manufactured by NOF Corp.) (3.0 g), stearyl trimethyl ammonium chloride (1.4 g), tripropylene glycol (16 g), ion-exchanged water (70 g), lauryl mercaptan (0.03 g), and acetic acid (0.12 g) were charged. The mixture was warmed at 60° C., preliminarily dispersed by a homomixer, and emulsified for 15 minutes by an ultrasonic emulsifier.

The emulsified liquid was transferred into a 300 mL four-necked flask (equipped with a stirrer, a condenser, a thermometer, and a nitrogen-introducing pipe), which was replaced with nitrogen. At 60° C., a polymerization initiator, that is, azobisamidinopropane dihydrochloride (0.3 g) was added to initiate the polymerization. After stirring at 60° C. for 4 hours, the disappearance of the monomer was confirmed by a gas chromatography (GC), and an aqueous dispersion having a solid content of 40% was obtained. The dispersion was diluted with ion-exchanged water to give a water- and oil-repellent composition having a solid content of 30%. The composition of the polymer was almost the same as the composition of the added monomers.

The characteristics of the water- and oil-repellent composition were evaluated. The results are shown in Table 4.

Examples 7 to 9, and Comparative Examples 7 to 8

A water- and oil-repellent composition having a solid content of 30% was obtained in the same manner as in Example 6 except that only the types and amounts of the monomers were as in Table 4. The characteristics of the obtained composition were evaluated. The results are shown in Table 4.

Example 10

Polymer Containing Vinyl Chloride $C_4F_9CH_2CH_2OCOC(CH_3)=CH_2$ (hereinafter referred to as "9FMA") (87.2 g g), stearyl acrylate (hereinafter referred to as "StA") (11.3 g), N-methylolacrylamide (hereinafter referred to as "N-MAM") (2.8 g), 3-chloro-2-hydroxypropyl methacrylate (hereinafter referred to as "CHPMA") (0.7 g), sorbitan monopalmitate (nonionic surfactant, HLB value: 7) (PP-40R manufactured by NOF Corp.) (2.1 g), polyoxyethylene oleyl ether (HLB value: 18) (BO-50 manufactured by Nikko Chemicals Co., Ltd.) (2.1 g), polyoxyethylene polyoxypropylene cetyl ether (HLB value: 13) (PBC-44 manufactured by Nikko Chemicals Co., Ltd.) (6.4 g), distearyl dimethyl ammonium chloride (cationic surfactant) (2.3 g), ion-exchanged water (272.3 g), lauryl mercaptan (0.5 g), and acetic acid (0.7 g) were charged. The mixture was warmed at 60° C., preliminarily dispersed by a homomixer, and emulsified for 15 minutes by an ultrasonic emulsifier.

The emulsified liquid was transferred into a 1,000 mL autoclave (equipped with a stirrer, a thermometer, and a nitrogen-introducing pipe). The autoclave was replaced with nitrogen and vinyl chloride (33.0 g) was charged. A polymerization initiator, that is, azobisamidinopropane dihydrochloride (1.0 g) was added and the mixture was heated at 60° C. to initiate the polymerization.

After stirring at 60° C. for 4 hours, unreacted vinyl chloride monomer was discharged. The conversion of vinyl chloride monomer was 80%. The disappearance of the other monomers was confirmed by a gas chromatography (GC), and an aqueous dispersion having a solid content of 32% was obtained. The dispersion was diluted with ion-exchanged water to give a water- and oil-repellent composition having a solid content of 30%.

The characteristics of the water- and oil-repellent composition were evaluated. The results are shown in Table 4.

Example 11 to 14

A water- and oil-repellent composition having a solid content of 30% was obtained in the same manner as in Example 10 except that only the types and amounts of the monomers were changed as in Table 4. The characteristics of the obtained composition were evaluated. The results are shown in Table 4.

Example 15

The water- and oil-repellent composition having a solid content of 30% obtained in Example 6 was diluted with water to give a treatment bath having a solid content of 0.45%. The water repellency, oil repellency and Bundesmann water leakage amount were evaluated by using this treatment bath as in Example 6. The results are shown in Table 5.

Example 16

The water- and oil-repellent composition having a solid content of 30% obtained in Example 6 was diluted with water to give a solid content of 0.45% and then a melamine resin (Sumitex resin M-3 manufactured by Sumitomo Chemical Industries Ltd.) (0.3%) and a catalyst (Sumitex Accelerator ACX manufactured by Sumitomo Chemical Industries Ltd.) (0.1%) were added to give a treatment bath.

The water repellency, oil repellency and Bundesmann water leakage amount were evaluated by using this treatment bath as in Example 15. The results are shown in Table 5.

Example 17

The water- and oil-repellent composition having a solid content of 30% obtained in Example 6 was diluted with water to give a solid content of 0.45% and then a blocked isocyanate (Elastron BN-69 manufactured by Dai-Ichi Kogyo Seiyaku Co., Ltd.) (0.5%) was added to give a treatment bath.

TABLE 4

| | Monomer | | Example 6 | 7 | 8 | 9 | 10 | 11 | 12 | 13 | 14 | Com. Ex. 7 | 8 |
|---|---|---|---|---|---|---|---|---|---|---|---|---|---|
| Fluorine-containing monomer | 9FMA (a1) | | 32.7 | | | | 34.8 | | | | | 32.7 | |
| | 13FMA (a1) | | | 32.7 | | | | 34.8 | | | | | 32.7 |
| | 9FA (a1) | | | | | | | | | | | | |
| | 9FCA (a1) | | | | 38.1 | 30.5 | | | 34.8 | 34.8 | 34.8 | | |
| | 13FCA (a1) | | | | | 7.6 | | | | | | | |
| Comonomer | StA (a2) | Tm = 56° C. | 20.0 | 20.0 | 14.6 | | 4.7 | 4.7 | 10.5 | | | | |
| | TCDA (a2) | Tg = 12° C. | | | | 14.6 | | | | | 4.7 | | |
| | VCl (a2) | Tg = 81° C. | | | | | 13.2 | 13.2 | 7.4 | 13.2 | 13.2 | | |
| | LA | Tg = −3° C. | | | | | | | | 4.7 | | | |
| | 2EHA | Tg = −50° C. | | | | | | | | | | | 20.0 |
| | BuA | Tg = −54° C. | | | | | | | | | 20.0 | | |
| | N-MAM (a3) | | 1.2 | 1.2 | 1.2 | 1.2 | 1.2 | 1.2 | 1.2 | 1.2 | 1.2 | 1.2 | 1.2 |
| | CHPMA (a3) | | 0.6 | 0.6 | 0.6 | 0.6 | 0.6 | 0.6 | 0.6 | 0.6 | 0.6 | 0.6 | 0.6 |
| Water repellency | Ny | | 5 | 5 | B5 | 5 | 5 | 5 | 5 | 5 | 5 | 3 | 2 |
| | PET/C | | 4 | 5 | 5 | 5 | 4 | 5 | 5 | 5 | 5 | 2 | 1 |
| Oil repellency | Ny | | 2 | 4 | 4 | 4 | 4 | 4 | 4 | 4 | 4 | 1 | 0 |
| | PET/C | | 4 | 6 | 5 | 5 | 5 | 6 | 6 | 6 | 6 | 2 | 1 |
| Bundesmann Water leakage amount (ml) After 10 minutes | | | 13 | 7 | 7 | 8 | 9 | 6 | 8 | 5 | 7 | 86 | 163 |
| Sedimentation stability | | | Good | Good | Good | Good | Good | Good | Good | Good | Good | Good | Good |
| Mechanical stability | | | Good | Good | Good | Good | Good | Good | Good | Good | Good | Good | Good |
| Chemical stability | | | Good | Good | Good | Good | Good | Good | Good | Good | Good | Good | Good |

9FMA: $C_4F_9CH_2CH_2OCOC(CH_3)=CH_2$
13FMA: $C_6F_{13}CH_2CH_2OCOC(CH_3)=CH_2$
9FA: $C_4F_9CH_2CH_2OCOCH=CH_2$
9FCA: $C_4F_9CH_2CH_2OCOCCl=CH_2$
13FCA: $C_6F_{13}CH_2CH_2OCOCCl=CH_2$
StA: Stearyl acrylate
TCDA: Tricyclodecyl acrylate
VCl: Vinyl chloride
LA: Lauryl acrylate
2EHA: 2-Ethylhexyl acrylate
BuA: n-Butyl acrylate
N-MAM: N-methylolacrylamide
CHPMA: 3-chloro-2-hydroxypropyl methacrylate The water repellency, oil repellency and Bundesmann water leakage amount were evaluated by using this treatment bath as in Example 15. The results are shown in Table 5.

TABLE 5

|  |  | Example | | |
|---|---|---|---|---|
|  |  | 15 | 16 | 17 |
| Water- and oil-repellent composition | | 1.5 | 1.5 | 1.5 |
| Water- and oil-repellent composition of Example6 | | | | |
| Crosslinking agent and catalyst | | | | |
| Melamine resin (M-3) | | — | 0.3 | — |
| Crystal (ACX) | | — | 0.1 | — |
| Blocked isocyanate(BN-69) | | — | — | 0.5 |
| Dilution water | | 98 | 97.6 | 97.5 |
| Water repellency | Ny | 5 | 5 | 5 |
|  | PET/C | 4 | 4 | 4 |
| Oil repellency | Ny | 2 | 2 | 2 |
|  | PET/C | 4 | 4 | 4 |
| Bundesmann Water leakage amount After 10 minutes | | 16 | 6 | 8 |

The invention claimed is:

1. An aqueous water- and oil-repellent composition comprising:

(A) a fluorine-containing copolymer which comprises:

(a1) a polymerizable monomer of the formula:

Rf—$R^2$—OCO$R^3$=$CH_2$, wherein Rf is a $C_1$ to $C_6$ perfluoroalkyl group or perfluoroalkenyl group, $R^2$ is a $C_1$ to $C_{10}$ alkylene group, and $R^3$ is a halogen, (a2) a polymerizable monomer which is copolymerizable with the monomer (a1) wherein a homopolymer of the polymerizable monomer (a2) has a glass transition temperature (Tg) of at least 50° C. and/or a melting point (Tm) of at least 30° C., and if necessary, (a3) a polymerizable monomer containing a polar group or a reactive group, the amount of the polymerizable monomer (a1) is at least 20% by weight based on the copolymer;

(B) a surfactant which comprises:

(b1) a nonionic surfactant which is a sorbitan ester and/or an alkylene oxide adduct thereof; and (C) an aqueous medium which is water alone or a mixture of water and an organic solvent.

2. The composition according to claim 1, wherein the amount of the component (a1) is from 40 to 95% by weight, the amount of the component (a2) is from 5 to 60% by weight, and the amount of the component (a3) is from 0 to 15% by weight, based on the fluorine-containing copolymer (A).

3. The composition according to claim 1, wherein the nonionic surfactant (b1) is at least one surfactant selected from the group consisting of sorbitan monolaurate, sorbitan monostearate, sorbitan monopalmitate, sorbitan monooleate, sorbitan sesquistearate, sorbitan tristearate, polyoxyethylene sorbitan monolaurate, polyoxyethylene sorbitan monopalmitate, polyoxyethylene sorbitan monostearate, polyoxyethylene sorbitan monooleate and polyoxyethylene sorbitan tristearate.

4. The composition according to claim 1, wherein the surfactant (B) further contains:

(b2) a nonionic surfactant other than the sorbitan ester and an alkylene oxide adduct thereof; and/or (b3) a cationic surfactant, in addition to the nonionic surfactant (b1).

5. The composition according to claim 4, wherein the nonionic surfactant (b2) is selected from the group consisting of an alkylene oxide adduct of linear and/or branched aliphatic (saturated and/or unsaturated) group; a polyalkylene glycol ester of linear and/or branched (saturated and/or unsaturated) fatty acid; a polyoxyethylene (POE)/polyoxypropylene (POP) copolymer; and an alkylene oxide adduct of acetylene glycol.

6. The composition according to claim 4, wherein the cationic surfactant (b3) is an ammonium salt.

7. The composition according to claim 4, wherein the cationic surfactant (b3) is ammonium salt of the formula:

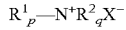

wherein $R^1$ is a linear and/or branched aliphatic (saturated and/or unsaturated) group having at least 12 carbon atoms, $R^2$ is H, a $C_{1-4}$ alkyl group, a benzyl group, or a polyoxyethylene group X is halogen, or a $C_{1-4}$ fatty acid anion group, p is 1 or 2, and q is 2 or 3, provided that p+q=4.

8. An aqueous water- and oil-repellent blend comprising the composition according to claim 1 and a crosslinking agent.

9. A method of treating a substrate, comprising treating the substrate with the aqueous water- and oil-repellent composition according to claim 1.

10. A treated material which is obtained by the treatment method according to claim 9.

11. A method of treating a substrate, comprising treating the substrate with the aqueous water- and oil-repellent blend according to claim 8.

12. A treated metal which is obtained by the treatment method according to claim 11.

13. The composition according to claim 1, wherein the homopolymer of the polymerizable monomer (a2) has a glass transition temperature (Tg) of at least 60° C.

14. The composition according to claim 1, wherein the homopolymer of the polymerizable monomer (a2) has a glass transition temperature (Tg) of at least 70° C.

* * * * *